United States Patent
Shimizu et al.

(10) Patent No.: US 7,361,203 B2
(45) Date of Patent: Apr. 22, 2008

(54) SLIDING COMPONENT AND METHOD FOR MANUFACTURING THE SAME

(75) Inventors: Teruo Shimizu, Niigata (JP); Tsuneo Maruyama, Niigata (JP)

(73) Assignee: Mitsubishi Materials Corporation, Tokyo (JP)

( * ) Notice: Subject to any disclaimer, the term of this patent is extended or adjusted under 35 U.S.C. 154(b) by 331 days.

(21) Appl. No.: 10/523,748

(22) PCT Filed: Aug. 4, 2003

(86) PCT No.: PCT/JP03/09862

§ 371 (c)(1),
(2), (4) Date: Feb. 3, 2005

(87) PCT Pub. No.: WO2004/020129

PCT Pub. Date: Mar. 11, 2004

(65) Prior Publication Data

US 2005/0265884 A1    Dec. 1, 2005

(30) Foreign Application Priority Data

Aug. 28, 2002    (JP)    ............... 2002-249692

(51) Int. Cl.
*B22F 3/12*    (2006.01)
*C22C 33/02*    (2006.01)

(52) U.S. Cl. ............... 75/246; 419/23; 419/38; 428/547; 428/548

(58) Field of Classification Search ............... 75/246; 419/23, 38; 428/547, 548
See application file for complete search history.

(56) References Cited

U.S. PATENT DOCUMENTS 6,015,775 A * 1/2000 Takayama et al. ......... 508/103
6,086,257 A * 7/2000 Lee ........................... 384/279
6,475,635 B1* 11/2002 Sakai et al. ................. 428/553
6,623,542 B2* 9/2003 Yamashita et al. ........... 75/243
2005/0078894 A1* 4/2005 Miyasaka et al. .......... 384/279

FOREIGN PATENT DOCUMENTS

| GB | 1454111 | 10/1976 |
|---|---|---|
| JP | 60-128201 | * 7/1985 |
| JP | 63-24041 | 11/1994 |
| JP | 2002-129203 | 1/2002 |

OTHER PUBLICATIONS

Patent Abstracts of Japan for JP2002-012903 published on Jan. 15, 2002.
International Search Report for PCT/JP03/09862 mailed on Sep. 30, 2003.
Patent Abstracts of Japan JP 60-128201 Published on Jul. 9, 1985.

* cited by examiner

*Primary Examiner*—Roy King
*Assistant Examiner*—Ngoclan T. Mai
(74) *Attorney, Agent, or Firm*—Darby & Darby P.C.

(57) ABSTRACT

A bearing is manufactured by filling iron-based material powder and copper-based material powder in a filling portion of a mold, compacting those material powder so as to form a green compact, and then sintering the green compact. The copper-based material powder contains flat powder particles, the flat powder particles having a large aspect ratio than particles of the iron-based material powder. The coppers-based powder particles segregate on a sliding surface by vibration. The sliding surface of a bearing is covered with copper, and a ratio of iron increases from the sliding surface toward the inside. Since a rotation shaft slides on the sliding surface covered with copper, a frictional coefficient between the rotation shaft and the sliding surface is reduced, thus enabling a smooth rotation thereof. Simultaneously the usage of iron imparts predetermined strength and durability.

15 Claims, 6 Drawing Sheets

(A)

(B)

(A)

(B)

SLIDING COMPONENT AND METHOD FOR MANUFACTURING THE SAME

CROSS-REFERENCE TO PRIOR APPLICATION

This is a U.S. National Phase application under 35 U.S.C. §371 of International Patent Application No. PCT/JP2003/009862 filed Aug. 4, 2003, and claims the benefit of Japanese Patent Application No. 2002-249692 filed Aug. 28, 2002 both of which are incorporated by reference herein. The International Application was published in Japanese on Mar. 11, 2004 as WO 2004/020129 A1 under PCT Article 21(2).

BACKGOUND OF THE INVENTION

1. Field of the Invention

The present invention relates to a sliding component such as a bearing or the like and a method for manufacturing the same.

2. Description of the Related Art

Typically, a bearing which supports a rotation shaft is one of the representatives of this kind of sliding components, which is manufactured by a well-known method including the steps of compacting material powders mainly composed of metallic materials so as to form a green compact; and then sintering this green compact to thereby obtain an oil impregnated sintered bearing as used popularly.

Oil impregnated sintered bearings are formed by using iron-based or copper-based material powder. If iron-based material powder is used, bearings with superior strength can be obtained. However, since an iron-based material such as steel is generally used for a rotation shaft, frictional resistance becomes large due to the same types of materials being used for both of the bearing and the rotation shaft so that a fused wear is very likely to occur, thus impairing durability thereof. On the contrary, if copper-based material powder is used, frictional resistance between the bearing and the rotation shaft becomes significantly small, but a wear of the bearing becomes large, and thus durability thereof is also impaired.

Like the general bearing products, oil impregnated bearing products have also been developed in order to provide ones with improved durability and reduced frictional resistance. For instance, oil impregnated sintered bearings using iron powders plated with copper or copper alloy as material powder are known. According to the bearings, because they are made up of composite materials consisting of copper and iron, the oil impregnated sintered bearings not only can reduce frictional resistance thereof but also can improve durability thereof compared to conventional ones.

Also, Japanese Examined Patent Publication No. 63-24041 proposes a method for manufacturing a sintered component, including the steps of adding a material forming the second phase to material powders forming a matrix so as to form a sintered mechanical component, wherein the second phase forming material is in the form of foil-like powder, of which the average particle size "a" is smaller than half of the average particle size "r" of the material powder (i.e., 2a<r). According to this method, a surface of the sintered component can be effectively covered with the second phase element of notably little additive amount, compared to by conventional techniques, and thus the sintered component whose surface is copper-rich can be obtained when copper in the form of foil-like powder is added to iron-based material powder.

Recently, in addition to requirements for wear proofness and durability, a further requirement for noiselessness has been raised to the bearings or the like. For instance, noiselessness in initiating the rotation of a rotation shaft in such a low-temperature state as low as minus 40 degrees centigrade is required, which, however, has been difficult for the conventional ones to meet.

The present invention has been made to solve the above-described problems, and it is accordingly an object thereof to provide a sliding component which can accomplish the reduction of frictional resistance thereof and the improvement of durability thereof, as well as the prevention of noises when initiating the rotation of a rotation shaft. Another object thereof is to provide a method for manufacturing the same.

SUMMARY OF THE INVENTION

In order to attain the above objects, according to a first aspect of the present invention, there is provided a sliding component formed by: filling an iron-based material powder and a copper-based material powder in a filling portion of a mold; compacting the iron- and copper-based material powders so as to form a green compact; and sintering the green compact, wherein: the copper-based material powder contains a flat-particle powder (hereinafter flat powder particles) of copper or copper alloy; an average value of maximum projected areas of the flat powder particles is larger than that of maximum projected areas of the iron-based material powder particles; and copper is allowed to segregate on one surface of the sliding component.

According to the above-described structure, the flat powder particles of copper or copper alloy are employed, and filled into the filling portion of the mold together with other material powder(s), allowing the flat powder particles to segregate on the surface of the sliding component, using vibration, electrostatic force, magnetic force or the like, whereby the sliding component thus obtained can have its surface covered with copper, generating a concentration gradient in which the copper-to-iron ratio thereof decreases from the surface of the sliding component toward the inside thereof while increasing the ratio of iron. Therefore, in a case that the bearing is formed from this sliding component, a rotation body is allowed to slide on the surface covered with copper with a reduced frictional coefficient between the rotation body and the surface, and thus a smooth rotation can be realized, while ensuring predetermined strength and durability by virtue of iron. Moreover, according to the above-described structure, even though the surface on which the rotation body slides wears, the sliding portions can maintain superior durability since copper is contained at the predetermined ratios under the worn surface.

Alternatively, in the above-described sliding component, the foregoing flat powder particles may have a larger aspect ratio than those of the iron-based material powder.

Moreover, in the above-described sliding component, the surface coverage of copper in the sliding portion of the sliding component may be greater than or equal to 60%. Thus, the frictional resistance between the sliding surfaces can be dramatically decreased. More preferably, such surface coverage of copper may be greater than or equal to 90%.

Further, the aforesaid sliding portion of the sliding component of the present invention may be a sliding surface of a cylindrical shape, thus providing a bearing rotationally supporting the rotation body by this sliding surface.

In order to attain the above objects, there is provided a method for manufacturing a sliding component according to another aspect of the present invention, including the steps of filling an iron-based material powder and a copper-based material powder in a filling portion of a mold; compacting the iron- and copper-based material powders so as to form a green compact; and sintering the green compact, wherein the copper-based material powder contains flat powder particles of copper or copper alloy; an average value of maximum projected areas of the flat powder particles is larger than that of maximum projected areas of the particles of the iron-based material powder; and the flat powder particles in the filling portion are allowed to segregate on the surface of the green compact.

According to the above-described structure, the flat powder particles of copper or copper alloy are employed, and then filled into the filling portion of the mold together with other material powder(s), allowing the flat powder particles to segregate on the surface of the sliding component, using vibration, electrostatic force, magnetic force or the like, whereby the obtained sliding component is covered with copper, generating a concentration gradient in which the copper-to-iron ratio decreases from the surface of the sliding component toward the inside thereof while increasing the ratio of iron, and thus the sliding component can have reduced frictional coefficient as well as superior durability.

Alternatively, in the above-described method, the flat powder particles may have a larger aspect ratio than the iron-based material powder. Thus, the flat powder particles are allowed to segregate on the surface of the green compact by vibration.

Moreover, in the above-described method, the aspect ratio of the flat powder particles may be greater than or equal to 10. When vibration is applied, the flat powder particles are allowed to successfully segregate on the surface, thus obtaining the sliding component of which the copper concentration is getting higher toward the surface. More preferably, the aspect ratio of the flat powder particles may be in the range of from 20 to 50.

Further, in the above-described method, the proportion of the flat powder particles may be in the range of 20 to 70% by weight of the entire material powders. If the proportion of the flat powder particles is less than 20% by weight, then the proportion of copper segregating toward the surface decreases, and thus frictional resistance becomes large. On the other hand, if the proportion of the flat powder particles is over 70% by weight, then the proportion of copper becomes too large to obtain superior strength. Accordingly, by employing the above-described range, the sliding component having reduced frictional resistance as well as superior strength can be obtained. More preferably, the proportion of the flat powder particles may be in a range of from 20 to 40% by weight.

Still further, according to the above-described method, the average value of the maximum projected areas of the flat powder particles may be at least three times as large as that of the maximum projected areas of the particles of the iron-based material powder. Due to such large difference in the maximum projected area, segregation is easy to take place, facilitating each particle's flat surface of the flat powder particles being disposed along a surface defining the surrounding of the filling portion. By applying vibration or the like in that condition, the flat powder particles are allowed to be more easily disposed along the surface defining the surrounding of the filling portion so that copper is allowed to easily segregate on the surface of the green compact.

BRIEF DESCRIPTION OF THE DRAWINGS

FIGS. 3A and 3B show a flat particle of copper-based material powder according to the preferred embodiment, wherein FIG. 3A is a side view thereof, and FIG. 3B is a front view thereof;

FIGS. 8A and 8B are explanatory diagrams schematically illustrating color pictures showing a surface of the sliding component for explaining a process for measuring a surface coverage of copper according to the preferred embodiment, wherein FIG. 8A shows a surface condition as measured, and FIG. 8B shows that it is grid-coded using hatchings.

DETAILED DESCRIPTION OF THE PREFERRED EMBODIMENT

Preferred embodiments of the present invention will now be explained in detail with reference to accompanying drawings. FIGS. 1 to 8 show an embodiment of the present invention.

Figure 1:
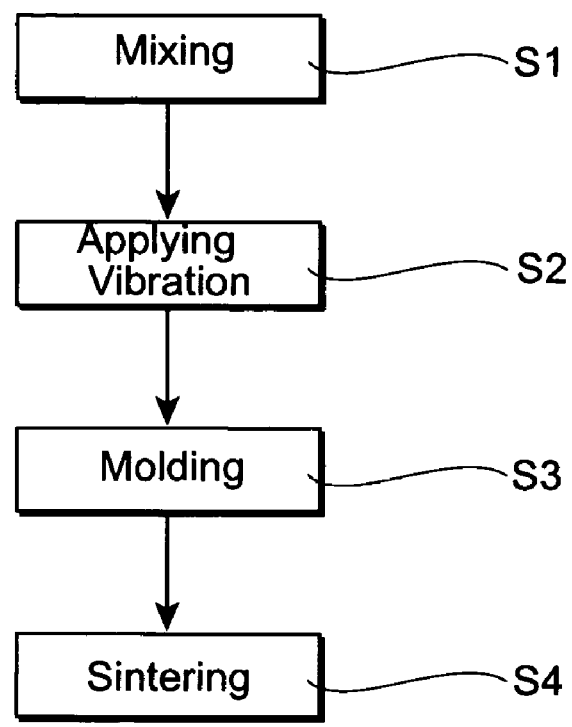
FIG. 1 is a flow chart for explaining a method for manufacturing a sliding component according to a preferred embodiment of the present invention.
Figure 2:
FIG. 2 is a front view showing an iron-based material powder according to the preferred embodiment.
Figure 3:
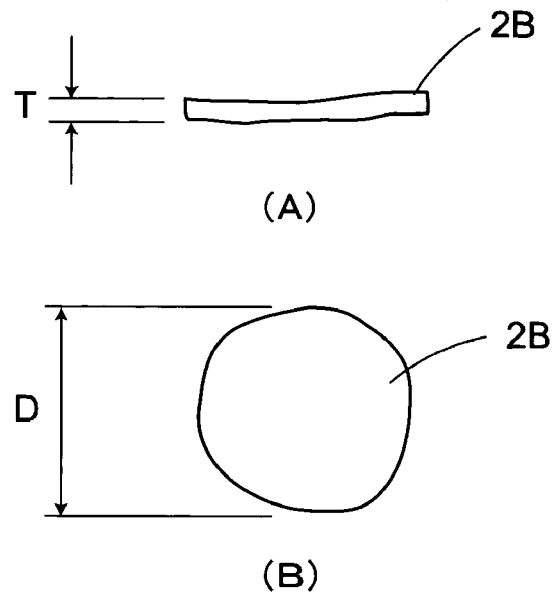
Figure 4:
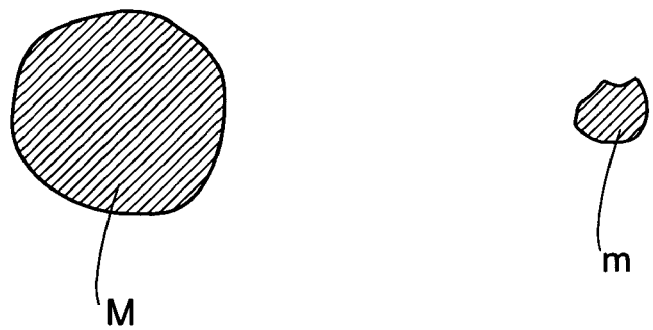
FIG. 4 is an explanatory diagram showing a maximum projected area according to the preferred embodiment.

First, a method for manufacturing a sliding component according to an embodiment of the present invention will now be explained. An iron-based material powder 1, a copper-based material powder 2 and a small amount of another material powder 3 are mixed as materials in a predetermined proportion (Step S1). For the iron-based material powder 1, a powder composed of substantially spherical and irregular particles such as atomized powder is used as shown in FIG. 2. For the copper-based material powder 2, an irregular-particle powder 2A and a flat powder particles 2B are used as shown in FIGS. 2, 3A and 3B.

An iron or iron alloy powder is used as the iron-based material powder 1, while copper or copper alloy powder is used as the copper-based material powder 2. Tin, carbon, phosphorus or zinc powder is used as the other material powder 3.

A preferable aspect ratio (diameter D/thickness T) of the flat powder particles 2B is greater than or equal to 10, which is more preferably in a range of 20 to 50. A preferable average value of a maximum projected area M of the flat powder particles 2B is greater than that of a maximum projected area m of the iron-based material powder 1, which is more preferably three times as large as that of the maximum projected area m. Meanwhile, what is meant by the term "maximum projected area" herein is a maximum area for an object to occupy when the object is projected on a plane. Moreover, a preferable proportion of the flat powder particles 2B in the entire materials is 20 to 70% by weight, which is more preferably 20 to 40% by weight. The aspect ratio of the flat powder particles 2B is greater than that of the iron-based material powder 1.

For instance, preferable materials may be comprised of 45 to 50% by weight of the copper material powder 2, 1 to 3% by weight of a tin material powder serving as the other material powder 3, 0.2 to 0.7% by weight of a carbon material powder also serving as the other material powder 3, 0.2 to 0.6% by weight of a phosphorous material powder also serving as the other material powder 3, 1 to 3% by weight of a zinc material powder also serving as the other material powder 3, and the iron material powder that is the remaining material powder, serving as the iron-based material powder 1. The ratio of the flat copper powder 2B to the entire material powders is 20 to 40% by weight. Meanwhile, when the ratio of the flat copper powder 2B is 20 to 40% by weight, then the irregular-particle copper powder 2A will make up 15 to 30% by weight.

Figure 5:
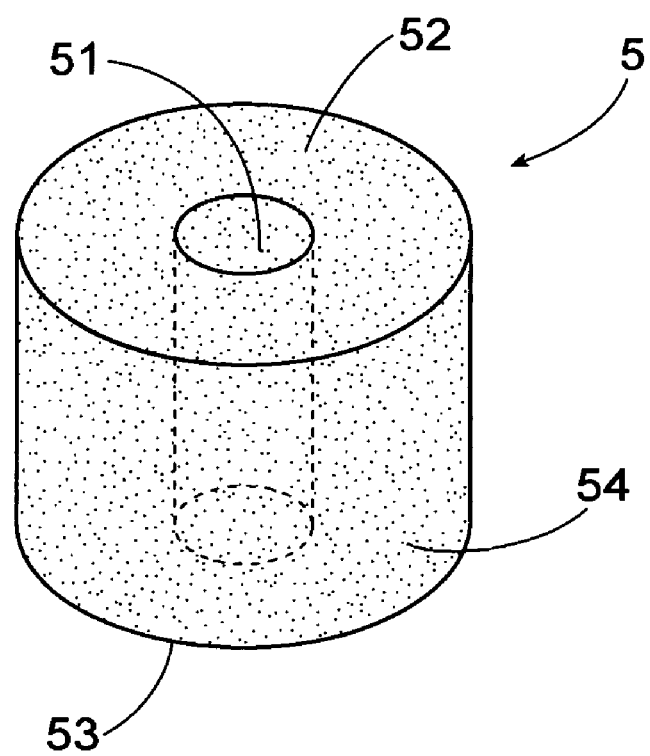
FIG. 5 is a perspective view showing a bearing according to the preferred embodiment.

As shown in FIG. 5, a bearing 5 is formed essentially cylindrical, while a sliding surface 51 of an essentially cylindrical shape, on which a rotation shaft (not shown) as a rotation body rotates and slides, is formed on a center of the bearing 5. On longitudinally opposite ends of the sliding surface 51 are formed flat end faces 52, 53 disposed parallel to each other, while a peripheral surface 54 thereof is formed cylindrical.

Figure 6:
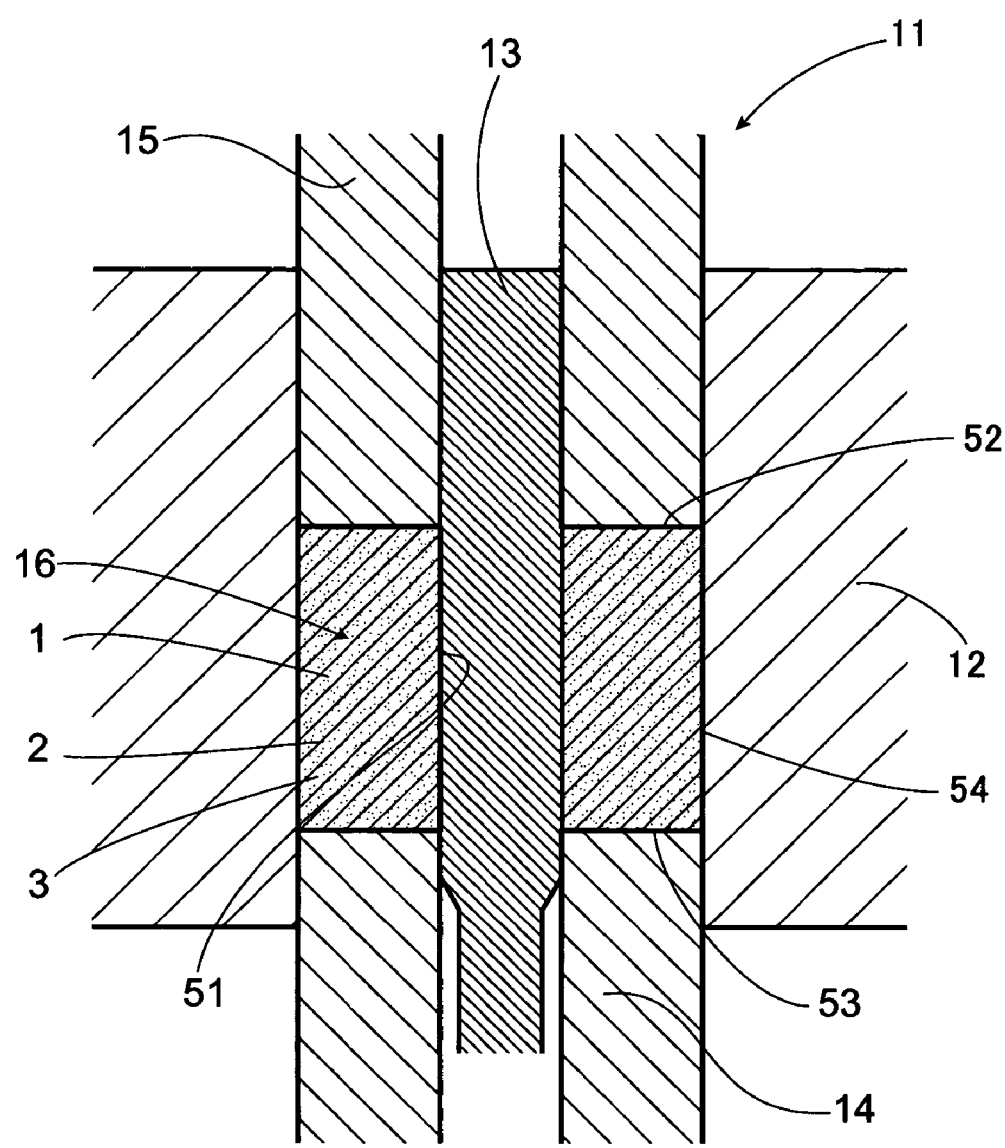
FIG. 6 is a cross sectional view showing a mold according to the preferred embodiment.

FIG. 6 shows an example of a mold 11. This mold 11 employs a structure that its top-to-bottom direction is aligned to an axial direction thereof (vertical axial pressing direction) and comprises: a die 12; a core rod 13, a lower punch 14; and an upper punch 15. The die 12 is formed into an essentially cylindrical shape with a hollow interior, while the core rod 13 that is formed into an essentially cylindrical-pillar shape is coaxially disposed in the hollow interior of the die 12. The lower punch 14 is formed into an essentially cylindrical shape with a hollow interior and fitted from the bottom side of the mold 11 into between the die 12 and the core rod 13 in a manner capable of freely moving up and down. Likewise, the upper punch 15 is formed into an essentially cylindrical shape with a hollow interior, and removably inserted from the top side of the mold 11 into between the die 12 and the core rod 13 in a manner capable of freely moving up and down. A filling portion 16 is formed inside the die 12 and between the core rod 13 and the lower punch 14, while a peripheral inner surface of the die 12 forms the aforesaid peripheral surface 54, an upper surface of the lower punch 14 forms the aforesaid end face 53, a lower surface of the upper punch 15 forms the end face 52, and a peripheral outer surface of the core rod 13 forms the sliding surface 51, respectively.

Figure 7:
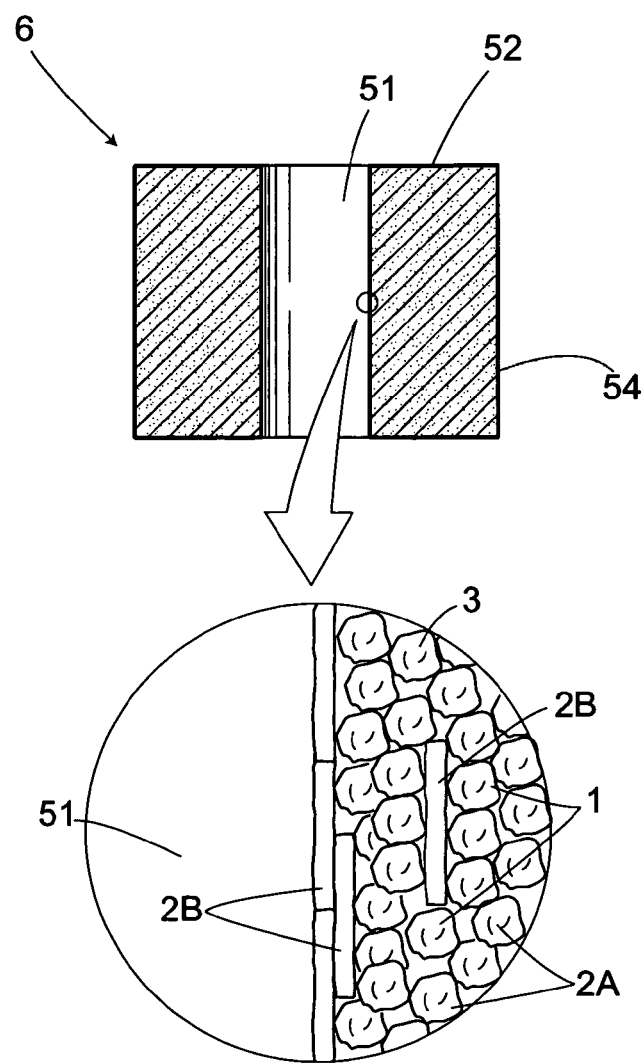
FIG. 7 is a partly enlarged cross sectional view showing a green compact according to the preferred embodiment.
Figure 8:
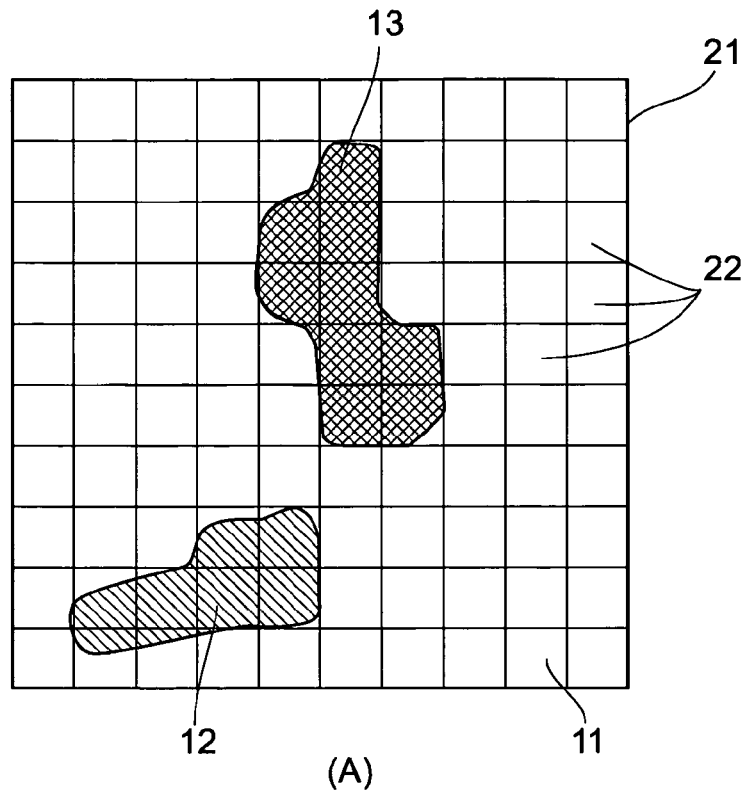
Figure 8:
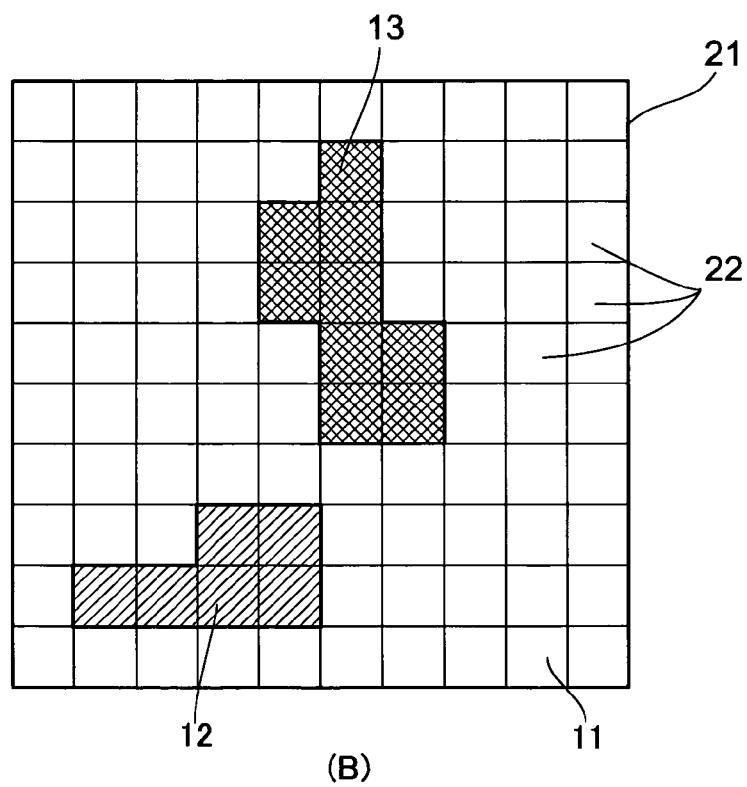

As shown in FIG. 6, the material powders 1, 2 and 3, which are mixed with one another (Step S1), are filled into the filling portion 16. Then, vibration is applied to the mixed material powders (Step S2). In this case, an upper portion of the filling portion 16 is blocked off by the upper punch 15, and then vibration of about 0.01-3 G is applied to the filling portion 16 without pressing by the upper and lower punches 14 and 15. When vibrated, the particles of flat powder particles 2B are allowed to segregate on the outer side within the filling portion 16, overlapped along the thickness direction thereof, while being gathered in a manner that each particle is disposed so that its lengthwise direction orthogonal to the thickness direction is aligned with a lengthwise direction of the surface of the sliding component. Then, a green compact 6 is formed by pressing the material powders 1, 2 and 3 in the filling portion 16, using the upper and lower punches 15 and 14 (Step S3). As shown in FIG. 7, it is to be noted that the green compact 6 allows the flat copper powder 2B to be gathered toward the surface, and the ratio of the iron-based material powder 1 gradually increases toward the inside thereof. By sintering the green compact 6 (Step S4) thus obtained, a bearing 5 as a sinter is formed.

Meanwhile, since each particle of the flat powder particles 2B has a relatively large flat surface, the flat powder particles 2B may be segregated on the outer side in the filling portion 16 by generating static electricity on a surface of the mold 11 surrounding the filling portion 16 or by applying magnetic force thereto.

Surface coverage of copper of not less than 90 percent was obtained when that of the bearing 5 produced under the following condition was measured: Namely, the material powders 1, 2 and 3 were composed of: 48% by weight of the copper material powder 2; 2% by weight of the tin material powder 3; 0.5% by weight of the carbon material powder 3; 0.4% by weight of the phosphorus material powder 3; 2% by weight of the zinc material powder 3; and the iron-based material powder 1 as the remaining material powder, in which the ratio of the flat copper powder 2B to the entire materials was 30% by weight. The material powders 1, 2 and 3 thus composed were filled into the filling portion 16, subjected to about 0.05 to 0.1 G vibration for 0.5 second, then pressurized to thereby form the green compact 6, and sintered to obtain the bearing 5.

The above-described surface coverage of copper is measured by the following procedures; taking a color picture of the surface of the bearing 5 (magnification: ×100); laying a frame of a predetermined 2 mm-square grid type tracing paper on the color picture; and calculating a ratio of an area of a copper region. An example thereof will now be explained with reference to FIGS. 8A and 8B. FIG. 8A shows a graphical representation of the color picture of the surface of the bearing 5 on which the copper region 11 of copper or copper alloy, an iron region 12 of iron or iron alloy and a pore region 13 appear. A plurality of grids 22 arranged in rows are formed on a predetermined region of a frame 21 comprising a clear board or the like. Both FIGS. 8A and 8B show the frame 21 having 10-by-10 grids as an example. Among the regions 11, 12 and 13, the one that occupies the largest area in each grid 22 is counted as one corresponding to each grid 22, and thus the surface coverage by the copper region 11 except the pore region 13 is calculated. For illustrative purposes, FIG. 8B shows that these regions 11, 12 and 13 are grid-coded using hatchings, in which the numbers of the grids 22 allocated to each region is 84 for the copper region 11, 6 for the iron region 12, and 9 for the pore region 13. Since the surface coverage of copper should be calculated excepting the pore region 13 from consideration, it is given by the following equation:

$$84/91 \times 100 = 92.3\%.$$

When the surface coverage of copper in the sliding surface 51 was 100%, frictional resistance thereof indicated the lowest value, and a noise was not generated in an experiment in which the rotation of the rotation shaft was initiated at the temperature of −40° C. Similar result was obtained up to about 90% surface coverage of copper. However, if the ratio of the copper-based material powder is over 70% by weight, then strength will be decreased even though the surface coverage of copper is 100%, and thus the ratio of the copper material powder 2 to the entire material powders were set in the range of from 20 to 70% by weight.

As described above, there is provided the bearing 5 as the sliding component according to the present embodiment, the sliding component being formed by: filling the iron-and copper-based material powders 1 and 2 into the filling portion 16 of the mold 11; compacting the material powders 1 and 2 so as to form the green compact 6; and then sintering the green compact 6, wherein the copper-based material powder 2 contains the flat powder particles 2B of copper or copper alloy; the average value of the maximum projected areas M of the flat powder particles 2B is larger than that of the maximum projected areas m of the particles of the iron-based material powder 1; and copper is allowed to segregate on the surface.

Thus, by filling the flat powder particles 2B into the filling portion 16 of the mold together with other material powder 1, allowing the flat powder particles 2B to segregate on the surface of the sliding component, using vibration, electrostatic force, magnetic force or the like, there can be provided the bearing 5 having its surface covered with copper, generating a concentration gradient in which the copper-to-iron ratio thereof decreases from the surface of the sliding component toward the inside thereof while increasing the ratio of iron to copper.

Accordingly, as the rotation body slides on the sliding surface 51 covered with copper, frictional resistance between the rotation body and the sliding surface 51 is reduced, and thus a smooth rotation is realized, while a predetermined strength as well as durability can be obtained by virtue of iron. Moreover, according to this structure, even though the sliding surface 51 wears due to the sliding by the rotation body, the sliding surface 51 can maintain superior durability since copper is contained at the predetermined ratios under the worn sliding surface 51.

Further, according to this embodiment, the flat powder particles 2B have a larger aspect ratio than the particles of the iron-based material powder 1, allowing copper to segregate on the surface.

Furthermore, since the surface coverage of copper in the sliding surface 51 serving as the sliding portion is greater than or equal to 60%, frictional resistance of the sliding surface 51 can be drastically decreased. More preferably, the surface coverage of copper in the sliding surface 51 may be not less than 90%.

Still further, in this embodiment, the sliding portion is defined by the cylindrical sliding surface 51, thus providing the bearing 5 rotationally supporting the rotation shaft by this sliding surface 51.

Moreover, according to this embodiment, in the manufacture method of the bearing 5 as the sliding component, comprising the steps of: filling iron-based material powder 1 and copper-based material powder 2 into the filling portion 16 of the mold 11; compacting the iron and copper-based material powders 1 and 2 so as to form the green compact 6; and sintering the green compact 6, wherein: the copper-based material powder 2 contains flat powder particles 2B of copper or copper alloy; and the average value of the maximum projected areas M of the flat powder particles 2B is larger than that of the maximum projected areas m of the particles of the iron-based material powder 1; and the flat powder particles 2B in the filling portion 16 is allowed to segregate on the surface of the green compact 6, whereby the bearing 5 formed from the green compact 6 can have reduced frictional coefficient as well as superior durability.

Moreover, according to this embodiment, the flat powder particles 2B have a larger aspect ratio than the particles of the iron-based material powder 1, and thus the flat powder particles 2B in the filling portion 16 can be allowed to segregate on the surface of the green compact 6.

Further, as the aspect ratio of the flat powder particles 2B is greater than or equal to 10, the flat powder particles 2B can be successfully segregated on the sliding surface 51 by applying vibration, static electricity, magnetic force or the like, and thus the bearing 5 having the sliding surface 51 with high copper concentration can be obtained. Meanwhile, the aspect ratio of the flat powder particles 2B may be more preferably in the range of 20 to 50.

Still further, as the ratio of the flat powder particles 2B to the entire material powders is in the range of from 20 to 70% by weight, the bearing 5 having small frictional resistance as well as superior strength can be produced. Meanwhile, the ratio of the flat powder particles 2B may be more preferably in a range of from 20 to 40% by weight.

Moreover, according to this embodiment, the average value of the maximum projected areas M of the flat powder particles 2B is at least 3 times larger than that of the maximum projected areas m of the particles of the iron-based material powder 1. As the difference in maximum projected area between the flat powder particles 2B and the particles of the iron-based material powder 1 is large, the segregation of the flat powder particles 2B is easy to take place, while each particle of the material powder 1 is brought into a condition contacting the surface of each of the flat powder particles 2B in the filling portion 16, whereby each flat surface of the flat powder particles 2B can be easily disposed along the surface surrounding the filling portion 16 (i.e., the surface defined by the surfaces of the die 12, the core rod 13, the punches 14 and 15 all forming the filling portion 16), and thus copper is easily segregated on the surface (sliding surface 51) of the green compact 6 by applying vibration in this condition.

The above-described embodiments are intended to illustrate the present invention, not to limit the scope of the present invention. Various embodiments and changes may be made thereonto without departing from the broad spirit and scope of the invention. For example, the flat powder particles 2B may be one of a bar-like shape. In that case, aspect ratio thereof is expressed as a ratio of its length to its diameter. Alternatively, the flat powder particles may take a square-tabular shape, and in that case, aspect ratio thereof is to be expressed as a ratio of a length of its diagonal line to its thickness. Further, the copper-based material powder 2 may be composed of the flat powder particles 2B only.

What is claimed is:

1. A sliding component comprising:
   a sintered green compact formed from compacted iron-based material powder and copper-based material powder,
   wherein said copper-based material powder contains flat powder particles of copper or copper alloy; an average value of maximum projected areas of the flat powder particles is larger than that of maximum projected areas of iron-based material powder particles; and copper is segregated on a surface of said sliding component.

2. The sliding component according to claim 1, further comprising: a sliding portion having a surface coverage of copper greater than or equal to 60%.

3. The sliding component according to claim 2, wherein the surface coverage of copper is greater than or equal to 90%.

4. The sliding component according to claim 1, wherein said sliding component generates a concentration gradient in which a copper-to-iron ratio thereof decreases from the surface of the sliding component toward an inside thereof while increasing the ratio of iron to copper.

5. The sliding component according to claim 2, wherein said one surface is a sliding surface formed in a cylindrical shape.

6. A method for manufacturing a sliding component, comprising the steps of:
   filling an iron-based material powder and a copper-based material powder into a filling portion of a mold;

compacting said iron-based material powder and copper-based material powder so as to form a green compact; and sintering said green compact, wherein said copper-based material powder contains flat powder particles of copper or copper alloy; an average value of maximum projected areas of the flat powder particles is larger than that of maximum projected areas of iron-based material powder particles; and said flat powder particles in the filling portion are segregated on a surface of said green compact.

7. he method for manufacturing a sliding component according to claim 6, wherein the aspect ratio of each flat powder particle is greater than or equal to 10.

8. The method for manufacturing a sliding component according to claim 7, wherein the aspect ratio of each flat powder particle is in a range of 20 to 50.

9. The method for manufacturing a sliding component according to claim 7, further including the step of:

segregating said flat powder particles toward the surface of said sliding component by applying vibration to said iron-based material powder and copper-based material powder filled in the filling portion of the mold.

10. The method for manufacturing a sliding component according to claim 6, wherein a ratio of said flat powder particles to the entire material powders is in a range of 20 to 70% by weight.

11. The method for manufacturing a sliding component according to claim 7, wherein a ratio of said flat powder particles to the entire material powders is in a range of 20 to 70% by weight.

12. The method for manufacturing a sliding component according to claim 10, wherein the ratio of said flat powder particles to the entire material powders is in a range of 20 to 40% by weight.

13. The method for manufacturing a sliding component according to claim 6, wherein the average value of the maximum projected areas of the flat powder particles is at least 3 times as large as that of the maximum projected areas of the iron-based material powder particles.

14. The method for manufacturing a sliding component according to claim 7, wherein the average value of the maximum projected areas of the flat powder particles is at least 3 times as large as that of the maximum projected areas of the iron-based material powder particles.

15. The method for manufacturing a sliding component according to claim 10, wherein the average value of the maximum projected areas of the flat powder particles is at least 3 times as large as that of the maximum projected areas of the iron-based material powder particles.

* * * * *

UNITED STATES PATENT AND TRADEMARK OFFICE
CERTIFICATE OF CORRECTION

| | |
|---|---|
| PATENT NO. | : 7,361,203 B2 |
| APPLICATION NO. | : 10/523748 |
| DATED | : April 22, 2008 |
| INVENTOR(S) | : Teruo Shimizu et al. |

It is certified that error appears in the above-identified patent and that said Letters Patent is hereby corrected as shown below:

In the Title Page: item (73);

Please delete "Mitsubishi Materials Corporation" and insert -- Mitsubishi Materials PMG Corporation --.

Signed and Sealed this

Eleventh Day of November, 2008

JON W. DUDAS
*Director of the United States Patent and Trademark Office*